3,217,066
CURABLE COMPOSITION COMPRISING UNSATURATED POLYESTER, EPOXIDIZED POLYBUTADIENE, UNSATURATED MONOMER AND ORGANIC PEROXIDE
Frank P. Greenspan, Larchmont, N.Y., and Murray H. Reich, Princeton, N.J., assignors to FMC Corporation, a corporation of Delaware
No Drawing. Filed June 1, 1961, Ser. No. 114,039
12 Claims. (Cl. 260—835)

This invention relates to improved polyester resins. More particularly, it relates to a method for improving the properties of unsaturated polyester resins by cross-linking them with an epoxidized polybutadiene.

Various attempts have been made to combine the properties of unsaturated polyester resins with those of epoxy resins. For example, U.S. Patent No. 2,859,199 teaches a resinous product formed by condensing a glycidyl polyether with an unsaturated polyester and cross-linking the resulting modified polyester with styrene in the presence of peroxide. Although the resinous products obtained by this procedure may have improved alkali resistance and increased extensibility, other properties, such as heat distortion temperature, and solvent resistance are inferior to those of the unsaturated polyester resin.

It is an object of this invention to improve the properties of unsaturated polyester resins by cross-linking them with epoxidized polybutadienes.

Another object is to provide cured polyester resins having improved age resistance, solvent resistance, and heat distortion temperature.

These and other objects will become apparent from the following description of this invention.

It has now been discovered that unsaturated polyester resins having improved heat distortion temperature, age resistance, and solvent resistance can be prepared by curing a mixture comprising about 50% to about 95% by weight of the total resin of, in combination, (a) an unsaturated polyester derived from an unsaturated dicarboxylic acid and a dihydric alcohol, and having an acid number in the range of 5–50, and (b) a reactive monomer containing a polymerizable double bond, said monomer being 10–65% of the total weight of polyester and monomer; from about 5% to about 50% by weight of the total resin of an epoxidized polybutadiene having an epoxy oxygen content of at least about 5% by weight; and a catalytic amount of a peroxide polymerization initiator having a decomposition temperature of at least 60° C. Surprisingly, the heat distortion temperature, age resistance, and solvent resistance of unsaturated polyester resins are greatly improved by curing them with epoxidized polybutadienes. Moreover, dramatic improvements in the flexural strength of polyester resins have been achieved, especially in the case of laminates.

It is believed that the unexpected results of this invention are achieved as a result of a combination of cross-linking reactions taking place within the system. During the curing of the resin mixture, the epoxidized polybutadiene polymer chains may cross-link directly with the polyester polymer chains through the reactive double bonds in each of these resins, or the two polymer chains may be cross-linked by the reactive monomer. Thus, the unsaturated polyester is combined with the epoxidized polybutadiene by cross-linking to form a closely knit resinous product. Furthermore, the epoxy oxygen groups in the epoxidized polybutadiene can condense with the polyester through esterification, or an epoxy curing agent may be added to cross-link the epoxy oxygen groups.

The unsaturated polyesters which are improved by this invention are the polymeric esters formed by the condensation of an unsaturated dicarboxylic acid with a dihydric alcohol. The acidic component of the polyester may be one or more of the dicarboxylic acids containing a polymerizable double bond including fumaric, maleic, mono-substituted maleic such as chloromaleic and citraconic, itaconic, bicycle-(2,2,1)-heptene-2,3-dicarboxylic, and bicyclo - (2,2,1)-5-methyl-5-heptene-2,3- dicarboxylic, as well as many other acids. When the anhydride of the dibasic acid exists, the anhydride is generally preferred as the source of the acidic component of the polyester. Throughout the specification and claims, the word "acid" is meant to include the acid anhydride as well as the free acid.

A portion of the acidic component of the polyester is generally derived from one or more of the polycarboxylic acids which do not contain a polymerizable double bond. Typical examples of these acids include phthalic, dichlorophthalic, tetrachlorophthalic, tetrahydrophthalic, hexahydrophthalic, dichloromaleic, malic, succinic, dodecenylsuccinic, octenylsuccinic, glutaric, adipic, pimelic, suberic, azelaic, sebacic, pyromellitic, trimellitic, bicyclo-(2,2,1) - 5-heptene-1,4,5,6,7,7-hexachloro-2,2-dicarboxylic, and many other acids. Generally, at least about 10% by weight of the acidic component is derived from an unsaturated dibasic acid—the remainder being derived from a polybasic acid containing no polymerizable double bond.

The dihydric alcohol component of the polyester may be one, or more, of the aliphatic and alicyclic diols, including aliphatic glycols such as ethylene glycol, diethylene glycol, polyethylene glycol, propylene glycol, dipropylene glycol, polypropylene glycol, butanediols, hexanediols, octanediols; alicyclic diols such as cyclopentanediols, and cyclohexanediols; and aliphatic diols containing aromatic rings such as xylylene glycol, dimethylxylylene glycol, and adducts of 2,2-bis (4-hydroxyphenyl) propane and ethylene oxide or propylene oxide, as well as a large number of other dihydroxy compounds. Unsaturated diols such as 2-butene-1,4-diol, dihydroxycyclopentene, and tetrahydroxycyclohexene may be used in combination with, or in place of, the unsaturated function of the acidic component.

The dibasic acid and dihydric alcohol are condensed to form the polyester by the application of heat. The reactants are heated to a temperature in the range of about 50–250° C. for about 5–16 hours. Generally the reaction is started at a low temperature, and the temperature is continually, or incrementally, raised at a slow rate to the higher temperatures which complete the reaction. The acid number of the polyester is generally in the range of about 5–50, and preferably from 15–40. Various techniques for the production of polyesters are described in Polyesters and their Applications, Reinhold Publishing Corp. (1956), pp. 40–43.

The reactive monomer which is used to cross-link the resin composition may be one or more of the aliphatic and aromatic compounds containing a polymerizable double bond which are conventionally employed to cross-link unsaturated polyesters. Illustrative examples of these reactive monomers include vinylbenzenes such as styrene, alpha-methylstyrene, and vinyltoluene and esters such as diallyl phthalate, diallyl isophthalate, allyl digycolate, methylmethacrylate, butylacrylate, butylmethacrylate, ethylene dimethacrylate, triallyl cyanurate, and triallyl isocyanurate. Generally, commercial polyesters contain 10–65% of reactive monomer based on the total weight of polyester and monomer. When the reactive monomer is an ester, the monomer content varies from 10–45%, while the vinylbenzenes are usually present in an amount of 30–50%.

The epoxidized polybutadiene, which is added to improve the properties of the polyester, is a polymer of butadiene which has been epoxidized. The polybutadiene itself may be prepared by any of a number of well known methods, such as emulsion or solution polymerization using a wide variety of catalysts, including free radical, alkali metal, Friedel-Crafts, and organo metallic catalysts. Preferably, the polymerization is carried out in the presence of a solvent with sodium as the catalyst.

Although any polybutadiene can be epoxidized to epoxypolybutadiene, best results are obtained with liquid polymers having a number average molecular weight below about 2500, corresponding to a viscosity below about 50 poises at 25° C. extrapolated to zero shear. Higher polymers are viscous when epoxidized to a high epoxy content, and thus are not as easily handle. When epoxidized to a lower epoxy content, higher molecular weight polymers may of course be used; at epoxy contents as low as about 5% by weight, polybutadienes having a molecular weight of about 8,000 and higher may be used. The lower limit of the molecular weight range for these polymers is about 100; that is, mixtures of dimers and trimers could actually be used, should they be desired to impart particular properties for special applications. In general, a convenient molecular weight range for the polybutadienes is in the range of about 250 to 5000. Polymers outside of the molecular weight ranges described may also be used, but in the high molecular weight ranges and with solid polymers, it is generally necessary to dissolve the polymer in a solvent before carrying out the epoxidation, and for certain applications, such as in preparing prepregs and coatings, this procedure may actually be preferred. Useful techniques for the polymerization of butadiene are described in U.S. Patents 2,631,175 and 2,791,618.

For the epoxidation of the polybutadiene, standard epoxidation techniques may be used. Aliphatic, aromatic, and inorganic peracids, salts of peracids, peroxides, and hydroperoxides are the most common of the effective epoxidizing agents. For convenience, the lower aliphatic peracids, such as performic, peracetic, perpropionic, and perbutyric are preferred reagents. With these reagents, the epoxidation reaction may be carried out using a preformed peracid mixture, or the peracid may be formed within the reaction medium, generally by adding hydrogen peroxide to an aliphatic acid or anhydride medium. Peracids may be prepared in any known manner, such as is described in Organic Synthesis, Reinhold Publishing Corp. (1957), page 302. A number of epoxidation techniques for polybutadienes are illustrated in U.S. Patent 2,826,556 to F. P. Greenspan and A. E. Pepe.

The epoxidation may be conducted using stoichiometric amounts of the peracid; that is, one mole of peracid per double bond in the polymer; or amounts below that theoretically required may be used. There is no significant advantage to using excess oxidant and, although the reactivity and properties of the epoxidized polybutadienes do vary with the degree of oxidation, it has been found that the use of as little as 20% of the theoretical amount of peracid will produce useful resins. In general, the epoxidized polybutadienes used herein contain at least about 5% by weight of epoxy oxygen, and it is preferred for most applications to employ liquid epoxypolybutadienes containing about 8–10% epoxy oxygen. Epoxypolybutadienes containing more than about 10% epoxy oxygen tend to be extremely viscous, especially in the higher molecular weight range; but this may actually be desired for special applications such as prepregs and coatings. As stated above, the viscosity of the epoxypolybutadiene may be lowered by the appropriate use of suitable solvents such as heptene, benzene, chloroform, and hexahydrophthalic anhydride.

The improved results of this invention are achieved by adding the epoxidized polybutadiene in an amount of about 5% to about 50% by weight of the total resin; that is, about 5–50% of the total resin composed of polyester, reactive monomer, and epoxidized polybutadiene. When curing agents for the epoxidized polybutadiene are present, they are not considered part of the resin content. There is a particularly sharp improvement in the properties of the cured product when the epoxidized polybutadiene is present in an amount of about 10–25% of the total resin. As the amount of epoxidized polybutadiene exceeds about 50%, no significant further improvement is obtained. While some improvement in properties of the polyester is obtained with as little as 1% of epoxidized polybutadiene, significant improvement is observed at about 5%.

As a polymerization initiator for curing the resin compositions taught herein, any of the organic peroxides having a decomposition temperature of at least 60° C. may be used. Decomposition temperature is defined as the temperature at which half of the peroxide in a dilute benzene solution decomposes in 10 hours. Illustrative examples of polymerization initiators having the required decomposition temperature include diacyl peroxides such as benzoyl peroxide, p-chlorobenzoyl peroxide, lauroyl peroxide, and caprylyl peroxide; dialkyl peroxides such as dicumyl peroxide, di(tert.-butyl) peroxide, and 2,5-bis-(tert.-butyl peroxide)-2,5-dimethylhexane; ketone and aldehyde peroxides such as methylethylketone peroxide, cyclohexanone peroxide, and hydroxyheptyl peroxide; hydroperoxides such as tert.-butyl hydroperoxide, p-menthane hydroperoxide, pinane hydroperoxide, and cumene hydroperoxide; peroxy esters such as tert.-butyl perbenzoate, di(tert.-butyl) diperphthalate, tert.-butyl peracetate, and tert.-butyl peroxyisobutyrate, and many others.

Any of the peroxides conventionally used to cure unsaturated polyesters may be used to cure the resin compositions of this invention, provided they have a decomposition temperature of at least 60° C., or are used in combination with a peroxide which does. Preferably, the resin compositions contain one or more peroxides having decomposition temperatures in the range of 70–130° C. If curing of the resin composition is to be effected in two or more stages by progressively increasing the temperature, a combination of two or more appropriately selected peroxides may be used. For example, a two stage cure may be carried out with a combination of peroxides: one decomposing at a temperature of 60–100° C., and the other decomposing at 100–130° C. Generally, the peroxide is present in an amount of about 0.1–5% by weight of the total resin, and preferably 0.5–3%.

As an additional component of the resin compositions taught herein, curing agents conventionally used for curing epoxidized polybutadienes may be added, if desired, to obtain certain effects. The most common curing agents for epoxidized polybutadienes are polyfunctional active hydrogen compounds including polycarboxylic anhydrides such as maleic, phthalic, hexahydrophthalic, tetrahydrophthalic, and pyromellitic anhydrides; polycarboxylic anhydride-polyhydric alcohol mixtures containing a diol such as ethylene, diethylene, propylene, and dipropylene glycol or a triol such as glycerol; polycarboxylic acids such as fumaric, maleic, phthalic, itaconic, malic, succinic, and pyromellitic acids; dihydroxyphenols such as resorcinol, catechol, and 2,2-bis(4-hydroxyphenyl) propane; amine acids such as para-aminobenzoic acid, and many others. By the use of these curing agents, further improvement in acetone resistance and ethylene dichloride resistance is achieved. In those cases in which improvement in flexural strength is obtained by curing the polyester with an epoxidized polybutadiene, further improvement in flexural strength can be achieved by the addition of a curing agent for the epoxidized polybutadiene.

The components of the resin compositions of this invention may be combined in any convenient manner. The epoxidized polybutadiene may be added to the polyester before, along with, or after the reactive monomer. The compositions may be formulated with any of the fillers conventionally used with polyesters, for example mineral fillers such as silica, calcium carbonate, and titanium dioxide and fibrous fillers such as glass, paper, and cloth. Other additives such as catalyst accelerators, pigments, and mold release agents may also be incorporated, if desired.

In order to achieve cross-linking between the polyester and the epoxypolybutadiene, a temperature of at least about 70° C. should be employed to cure the resin compositions. At temperatures below this level, the double bond in the epoxidized polybutadiene is not sufficiently activated to enter into the cross-linking reaction. However, starting temperatures below 70° C. may be employed when a low temperature catalyst is used in combination with a high temperature catalyst, provided the low temperature cross-linking of the polyester produces sufficient exothermic heat to raise the temperature of the resin composition to the required temperature of 70° C., or above.

The resin compositions of this invention are particularly suitable for laminating applications. The epoxidized polybutadiene increases the adhesion of the resin to the reinforcing filler, such as glass cloth, with the result that dramatic enhancement in flexural strength, and in many cases in compression and tensile strengths, is achieved.

The resin compositions taught herein may be cured in molding, coating, laminating, and casting applications. Casting and laminating techniques are preferably carried out at temperatures of about 80–180° C., while molding and coating techniques employ a faster cure at temperatures in the range of 100–200° C. The curing time may vary from 15 seconds to as much as 30 hours, depending upon the method of curing. Preferably, the resin compositions are cured for a period of 30 seconds to 5 hours.

The following examples are presented to further illustrate the novel process and resin composition disclosed herein, without any intention that the invention be limited thereto. All parts and percentages are by weight.

*Example 1*

An unsaturated polyester was prepared as follows: A mixture of 25 parts of maleic anhydride, 22 parts of sebacic acid, and 53 parts of propylene glycol were heated at temperatures starting at 110° C. and slowly rising to 165° C. over a 1.5 hour period. The temperature was then maintained at 165° C. for an additional 3 hours, to give an unsaturated polyester having an acid number of 30.

Butadiene was polymerized as follows: About 4.3 parts of sodium as a 46% dispersion in kerosene and 162 parts of benzene were charged to an agitated reactor, the temperature was raised to 90° C., and 3.0 parts of technical grade butadiene were added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383, viscosity of 16.4 poises at 25° C. extrapolated to zero shear, and number average molecular weight of 980.

This polybutadiene was epoxidized as follows: About 100 parts of liquid polybutadiene, 100 parts of benzene, 31.6 parts of Dowex resin 50 X–12 (a sulfonated styrene-divinylbenzene polymer cross-linked with 12% divinylbenzene) and 16.2 parts of glacial acetic acid were heated with agitation to 60° C. About 70 parts of 50% hydrogen peroxide were then added over a period of 3 hours. The temperature was maintained at 60° C. for an additional 2 hours, the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene by heating at 80° C. and 60 mm. Hg. The epoxypolybutadiene obtained as residue had an epoxy oxygen content of 8.98% and a viscosity of 1685 poises at 25° C. extrapolated to zero shear.

(A) A resin composition was prepared by blending together 45 parts of the unsaturated polyester, 50 parts of styrene, 5 parts of the epoxidized polybutadiene, and 1.9 parts of 2,5-bis(tert.-butyl peroxide)-2,5-dimethylhexane by stirring. The composition was poured into a sheet mold and precured by heating for 2 hours at 90° C. and 2 hours at 155° C. without the application of pressure. Samples of the casting were tested to measure flexural strength using ASTM designation D790–59T. Acetone resistance was determined by immersing samples in acetone for 7 days and measuring the weight gain in accordance with ASTM designation D543–56T. Other samples were tested to determine ethylene dichloride resistance by immersing them in ethylene dichloride for 7 days in accordance with ASTM designation D543–56T and measuring the weight gain. Additional precured samples were postcured by heating at 155° C. for an additional 22 hours and tested to measure flexural strength, acetone resistance and ethylene dichloride resistance, as before.

(B) Another resin composition was prepared by blending together 45 parts of the unsaturated polyester, 50 parts of styrene, 5 parts of the epoxidized polybutadiene, 1.9 parts of 2,5-bis(tert.-butyl peroxide)-2,5-dimethylhexane, 3.1 parts of hexahydrophthalic anhydride, and 0.4 part of glycerol. The blend was poured into a sheet mold and cured, as before. Precured and postcured samples of the casting were tested to measure flexural strength and acetone resistance.

(C) Another resin composition was prepared by blending together 41 parts of the unsaturated polyester, 46 parts of styrene, 13 parts of the epoxidized polybutadiene, and 1.7 parts of 2,5-bis(tert.-butyl peroxide)-2,5-dimethylhexane. The blend was poured into a sheet mold and precured, as before. Samples of the precured casting were tested to measure flexural strength, and acetone resistance. Additional samples were postcured, as before, and tested to measure flexural strength, acetone resistance, and ethylene dichloride resistance.

(D) Another resin composition was prepared by blending together 41 parts of the unsaturated polyester, 46 parts of styrene, 13 parts of the epoxidized polybutadiene, 1.7 parts of 2,5-bis(tert.-butyl peroxide)-2,5-dimethylhexane, 8.4 parts of hexahydrophthalic anhydride, and 0.66 part of glycerol. The blend was poured into a sheet mold and precured, as before. Samples of the precured casting were tested to measure flexural strength. Other samples were postcured, as before, and tested to measure flexural strength, acetone resistance, and ethylene dichloride resistance, as before.

(E) Another resin composition was prepared by blending together 36 parts of the unsaturated polyester, 41 parts of styrene, 23 parts of the epoxidized polybutadiene, and 1.5 parts of 2,5-bis(tert.-butyl peroxide)-2,5-dimethylhexane. The blend was poured into a sheet mold and precured, as before. Samples of the precured casting were tested to measure flexural strength and acetone resistance. Additional samples were postcured and tested to measure flexural tsrength, acetone resistance, and ethylene dichloride resistance.

(F) Still another resin composition was prepared by blending together 36 parts of the unsaturated polyester resin, 41 parts of styrene, 23 parts of the epoxidized polybutadiene, 1.5 parts of 2,5-bis(tert.-butyl peroxide)-2,5-dimethylhexane, 14.8 parts of hexahydrophthalic anhydride, and 1.15 parts of glycerol. The blend was poured into a sheet mold and precured, as before. Samples of the precured casting were tested to measure acetone resistance. Other samples were postcured and tested to measure acetone and ethylene dichloride resistance.

(G) For the purpose of comparison, the example was repeated, omitting the epoxidized polybutadiene. Forty-seven parts of the unsaturated polyester were blended with 53 parts of styrene and 0.1 part of benzoyl peroxide. The blend was poured into a sheet mold and precured 24 hours at room temperature, 2 hours at 70° C., and 2 hours at 115° C. Samples of the precured casting were tested to measure flexural strength, acetone resistance, and ethylene dichloride resistance. Additional precured samples were postcured 24 hours at 155° C. and tested to measure flexural strength, acetone resistance, and ethylene dichloride resistance.

The data obtained from testing the above resin compositions are given in the following table:

heat distortion temperature, acetone resistance, and age resistance.

The following data were obtained for the above resin compositions.

| Sample | Epoxidized polybutadiene, percent | Heat distortion temperature, °C. | Acetone resistance, percent weight gain | | Age resistance, percent weight loss |
|---|---|---|---|---|---|
| | | | Precure | Postcure | |
| A | 5 | 127 | | 0.6 | |
| B | 20 | 150 | 0.2 | 0.2 | 4.9 |
| C | 0 | 103 | 3.5 | 1.3 | 15.5 |

| Sample | Epoxidized polybutadiene, percent | Flexural strength, p.s.i. | | Chemical resistance | | | |
|---|---|---|---|---|---|---|---|
| | | | | Percent weight gain in acetone | | Percent weight gain in ethylene dichloride | |
| | | Precured | Postcured | Precured | Postcured | Precured | Postcured |
| A | 5 | 11,800 | 12,000 | 5.9 | 5.0 | 12.2 | 10.4 |
| B | *5 | 14,000 | 12,400 | 3.5 | 4.6 | | |
| C | 13 | 14,600 | 13,100 | 7.5 | 4.6 | | 9.9 |
| D | *13 | 11,500 | 12,700 | | 3.2 | | 5.7 |
| E | 23 | 11,900 | 11,800 | 16.8 | 5.1 | | 12.8 |
| F | *23 | 12,500 | 15,300 | 9.3 | 2.2 | | 5.8 |
| G | 0 | 9,200 | 11,900 | Crumbled | 3.4 | Crumbled | Crumbled |

* Contained an epoxy curing agent.

Example 2

An unsaturated polyester was prepared as follows: A mixture of 32 parts of maleic anhydride, 15 parts of phthalic anhydride, and 50 parts of propylene glycol were heated at temperatures starting at 100° C. and slowly rising to 150° C. over a 1.5 hour period. The temperature was then maintained at 150° C. for 1.5 hours, to give an unsaturated polyester having an acid number of 48.

(A) A resin composition was prepared by blending together 62 parts of the above unsaturated polyester, 33 parts of diallyl phthalate, 5 parts of epoxidized polybutadiene prepared in Example 1, and 1.0 parts of 2,5-bis(tert.-butyl peroxide)-2,5-dimethylhexane. The blend was poured into a sheet mold and precured at 115° C. for 2 hours and postcured by heating at 155° C. for 24 hours. Samples of the casting were tested to measure acetone resistance. The heat distortion temperature of the casting was determined by testing samples in accordance with ASTM designation D648–56.

(B) Another resin composition was prepared by blending 52 parts of the above unsaturated polyester, 28 parts of diallyl phthalate, 20 parts of the epoxidized polybutadiene prepared in Example 1, 1.5 parts of benzoyl peroxide, and 1.5 parts of 2,5-bis(tert.-butyl peroxide)-2,5-dimethylhexane. The blend was poured into a sheet mold and precured by heating for 2 hours at 90° C., 2 hours at 115° C., and 2 hours at 155° C. Samples of the precured casting were tested to measure acetone resistance. Additional samples were postcured for an additional 22 hours at 155° C. and tested to measure heat distortion temperature and acetone resistance. Age resistance was determined by heating postcured samples for 1 week at 200° C. and measuring the weight loss.

(C) For the purpose of comparison, the example was repeated, omitting the epoxidized polybutadiene. Sixty-five parts of the unsaturated polyester were blended with 35 parts of diallyl phthalate and 1.0 part of benzoyl peroxide. The blend was poured into a sheet mold and precured 2 hours at 60° C., 2 hours at 90° C., and 0.5 hour at 115° C. Samples of the casting were tested to measure acetone resistance. Additional precured samples were postcured 24 hours at 155° C. and tested to measure

Example 3

An unsaturated polyester was prepared as follows: A mixture of 22 parts of maleic anhydride, 37 parts of phthalic anhydride, and 41 parts of propylene glycol were heated at temperatures starting at 100° C. and slowly rising to 150° C. over a 1.5 hour period. The temperature was then maintained at 150° C. for an additional 2.5 hours, to give an unsaturated polyester having an acid number of 41.

(A) A resin composition was prepared by blending together 64 parts of the unsaturated polyester, 28 parts of styrene, 8 parts of the epoxidized polybutadiene prepared in Example 1, and 1.0 part of 2,5-bis(tert.-butyl peroxide)-2,5-dimethylhexane. The blend was poured into a sheet mold and precured at 115° C. for 2 hours and postcured at 155° C. for 24 hours. Samples of the casting were tested to measure heat distortion temperature.

(B) Another resin composition was prepared by blending together 56 parts of the above unsaturated polyester, 24 parts of styrene, 20 parts of the epoxidized polybutadiene prepared in Example 1, 1.5 parts of benzoyl peroxide, and 1.5 parts of 2,5-bis(tert.-butyl peroxide)-2,5-dimethylhexane. The blend was poured into a sheet mold and precured 2 hours at 90° C., 2 hours at 115° C., 1 hour at 130° C., and 2 hours at 155° C. Samples of the precured casting were tested to measure acetone resistance. Additional precured samples were postcured for an additional 22 hours at 155° C. and tested to measure heat distortion temperature, acetone resistance, and age resistance.

(C) For the purpose of comparison, the example was repeated, omitting the epoxidized polybutadiene. Seventy parts of the unsaturated polyester were blended with 30 parts of styrene and 1.0 part of benzoyl peroxide. The blend was poured into a sheet mold and precured 2 hours at 60° C., 2 hours at 90° C., and 0.5 hour at 115° C. Samples of the precured casting were tested to measure acetone resistance. Additional precured samples were postcured 24 hours at 155° C. and tested to measure heat distortion temperature, acetone resistance, and age resistance.

The data obtained for the above resin compositions are as follows:

| Sample | Epoxidized polybutadiene, percent | Heat distortion temperature, °C. | Acetone resistance, percent weight gain | | Age resistance, percent weight loss |
|---|---|---|---|---|---|
| | | | Precure | Postcure | |
| A | 8 | 112 | | | |
| B | 20 | 102 | 6.6 | 0.2 | 6.9 |
| C | 0 | 82 | Crumbled | Crumbled | 12.2 |

*Example 4*

An unsaturated polyester was prepared as follows: A mixture of 39 parts of maleic anhydride, 38 parts of adipic acid, and 23 parts of dipropylene glycol were heated at temperatures starting at 120° C. and slowly rising to 160° C. over a 1 hour period. The temperature was then maintained at 160° C. for an additional three hours, to give an unsaturated polyester having an acid number of 47.

(A) A resin composition was prepared by blending together 57 parts of the unsaturated polyester, 23 parts of vinyl toluene, 20 parts of the epoxidized polybutadiene prepared in Example 1, 1.0 part of benzoyl peroxide, and 1.0 part of dicumyl peroxide. The blend was poured into a sheet mold and cured for 2 hours at 115° C. and 24 hours at 155° C. Samples of the casing were tested to measure heat distortion temperature, acetone resistance, and age resistance.

(B) For the purpose of comparison, the example was repeated, omitting the epoxidized polybutadiene. Seventy-one parts of the unsaturated polyester were blended with 29 parts of vinyl toluene and 1.0 part of benzoyl peroxide. The blend was poured into a sheet mold and cured 24 hours at room temperature, 2 hours at 70° C., 2 hours at 115° C., and 24 hours at 155° C. Samples of the casting were tested to measure heat distortion, temperature, acetone resistance, and age resistance.

The data obtained from the above tests are as follows:

| Sample | Epoxidized polybutadiene, percent | Heat distortion temperature, °C. | Acetone resistance, percent weight gain | Age resistance, percent weight loss |
|---|---|---|---|---|
| A | 20 | 103 | 2.7 | 4.1 |
| B | 0 | 78 | 12.7 | *4.4 |

*Cracked.

*Example 5*

An unsaturated polyester was prepared as follows: A mixture of 19 parts of maleic anhydride, 46 parts of phthalic anhydride, and 35 parts of propylene glycol were heated at temperatures starting at 100° C. and slowly rising to 175° C. over a 2 hour period. The temperature was then maintained at 175° C. for an additional 2.5 hours, to give an unsaturated polyester having an acid number of 29.

(A) A resin composition was prepared by blending together 63 parts of the unsaturated polyester, 25 parts of styrene, 12 parts of the epoxidized polybutadiene prepared in Example 1, and 1.0 part of dicumyl peroxide. The blend was poured into a sheet mold and cured for 2 hours at 115° C. and 24 hours at 155° C. Samples of the casting were tested to measure heat distortion temperature and age resistance.

(B) For comparison, the example was repeated, omitting the epoxidized polybutadiene. Seventy-two parts of the unsaturated polyester were blended with 28 parts of styrene and 1.0 part of benzoyl peroxide. The blend was poured into a sheet mold and cured for 2 hours at 60° C., 2 hours at 90° C., 0.5 hour at 115° C., and 24 hours at 155° C. Samples of the casting were tested to measure heat distortion temperature and age resistance.

The data obtained in this example are reported in the following table:

| Sample | Epoxidized polybutadiene, percent | Heat distortion temperature, °C. | Age resistance, percent weight loss |
|---|---|---|---|
| A | 12 | 73 | 10.8 |
| B | 0 | 63 | *10.4 |

*Cracked.

*Example 6*

An unsaturated polyester was prepared as follows: A mixture of 17 parts of maleic anhydride, 46 parts of phthalic anhydride, and 37 parts of propylene glycol were heated at temperatures starting at 100° C. and slowly rising to 150° C. over a 1.5 hour period. The temperature was then maintained at 150° C. for an additional 3.5 hours, to give an unsaturated polyester having an acid number of 32.

(A) A resin composition was prepared by blending together 49 parts of the unsaturated polyester, 31 parts of styrene, 20 parts of the epoxidized polybutadiene prepared in Example 1, and 1.0 part of dicumyl peroxide. The blend was poured into a sheet mold and cured for 2 hours at 90° C. and for 24 hours at 155° C. Samples of the casting were tested to measure heat distortion temperature and age resistance.

(B) For the purpose of comparison, the example was repeated, omitting the epoxidized polybutadiene. Sixty-one parts of the unsaturated polyester were blended with 39 parts of styrene and 1.0 part of benzoyl peroxide. The blend was poured into a sheet mold and cured 2 hours at 60° C., 2 hours at 90° C., 0.5 hour at 115° C. and 24 hours at 155° C. Samples of the casting were tested to determine heat distortion temperature, and age resistance.

The data obtained from the above tests are as follows:

| Sample | Epoxidized polybutadiene, percent | Heat distortion temperature, °C. | Age resistance, percent weight loss |
|---|---|---|---|
| A | 20 | 82 | 4.8 |
| B | 0 | 74 | 11.1 |

*Example 7*

An unsaturated polyester was prepared as follows: A mixture of 22 parts of maleic anhydride, 37 parts of phthalic anhydride, and 41 parts of propylene glycol were heated at temperatures starting at 110° C. and slowly rising to 150° C. over a 2 hour period. The temperature was then maintained at 150° C. for an additional 2 hours, to give an unsaturated polyester having an acid number of 39.

(A) A resin composition was prepared by blending together 50 parts of the unsaturated polyester, 27 parts of styrene, 23 parts of the epoxidized polybutadiene prepared in Example 1, and 1.5 parts of 2,5-bis(tert.-butyl peroxide)-2,5-dimethylhexane. The blend was poured into a sheet mold and cured for 2 hours at 90° C. and for 24 hours at 155° C. Samples of the casting were tested to measure acetone resistance and age resistance.

(B) For the purpose of comparison, the example was repeated, omitting the epoxidized polybutadiene. Sixty-five parts of the unsaturated polyester were blended with 35 parts of styrene and 1.0 part of benzoyl peroxide. The blend was poured into a sheet mold and cured 24 hours at room temperature, 2 hours at 70° C., 2 hours at 115° C., and 24 hours at 155° C. Samples of the casting were tested to measure acetone resistance and age resistance. The following data were obtained in these tests.

| Sample | Epoxidized polybutadiene, percent | Acetone resistance, percent weight gain | Age resistance, percent weight loss |
|---|---|---|---|
| A | 23 | 5.2 | 6.9 |
| B | 0 | Crumbled | *10.0 |

*Cracked.

Laminates were prepared from blends of the unsaturated polyester and epoxidized polybutadiene as follows:

(C) A resin composition was prepared by blending together 52 parts of the unsaturated polyester, 28 parts of styrene, 20 parts of the epoxidized polybutadiene prepared in Example 1, 15 parts of hexahydrophthalic anhydride, 1.2 parts of glycerol, 1.5 parts of 2,5-bis(tert.-butyl peroxide)-2,5-dimethylhexane, and 1.0 part of benzoyl peroxide. Using standard wet lay-up techniques, a 13-ply laminate was prepared by working the resin composition into successive layers of No. 181–136 fiber glass cloth having a vinyl trichlorosilane finish. The lay-up was molded using a ⅛ inch shim in a hydraulic press at 116° C. for 2 hours. The laminate was postcured for 2 hours in an oven at 155° C. The resulting laminate had a resin content of 31%. Specimens were cut from the laminate and tested to determine flexural strength. The compression strength of the laminate was determined by measuring specimens in accordance with ASTM designation D695–54.

(D) A resin composition was prepared by blending together 33 parts of the unsaturated polyester, 17 parts of styrene, 50 parts of the epoxidized polybutadiene prepared in Example 1, 37 parts of hexahydrophthalic anhydride, 3 parts of glycerol, 1.5 parts of 2,5-bis(tert.-butyl peroxide)-2,5-dimethylhexane, and 1.0 part of benzoyl peroxide. A 13-ply laminate was prepared as before, molded 116° C. for 2 hours in a hydraulic press using a ⅛ inch shim, and postcured 2 hours at 155° C. The laminate had a resin content of 34%. Specimens of the laminate were tested to determine flexural strength and compression strength.

(E) For comparison, a laminate was prepared, omitting the epoxidized polybutadiene and the epoxy curing agent. Sixty-five parts of the unsaturated polyester were blended with 35 parts of styrene and 1.0 parts of benzoyl peroxide. A 13-ply laminate was prepared as before, molded at 116° C. for 2 hours in a hydraulic press using a ⅛ inch shim, and postcured 2 hours at 155° C. The laminate had a resin content of 32%. Specimens of the laminate were tested to measure flexural strength and compression strength.

The data obtained for the above laminates are as follows:

| Sample | Epoxidized polybutadiene, percent | Flexural strength, p.s.i. | Compression strength, p.s.i. |
|---|---|---|---|
| C | 20 | 89,800 | 58,000 |
| D | 50 | 94,000 | 44,000 |
| E | 0 | 58,400 | 35,200 |

*Example 8*

An unsaturated polyester was prepared as follows: A mixture of 16 parts of maleic anhydride, 68 parts of isophthalic acid, and 16 parts of propylene glycol were heated at temperatures starting at 130° C. and slowly rising to 175° C. over a 1.5 hour period. The temperature was then maintained at 175° C. for an additional 3 hours, to give an unsaturated polyester having an acid number of 44.

(A) A resin composition was prepared by blending together 48 parts of the unsaturated polyester, 32 parts of styrene, 20 parts of the epoxidized polybutadiene prepared in Example 1, 1.0 part of benzoyl peroxide and 1.0 part of dicumyl peroxide. The blend was poured into a sheet mold and precured for 2 hours at 115° C. and 2 hours at 155° C. Samples of the precured casting were tested to measure flexural strength. Additional precured samples were postcured by heating at 155° C. for an additional 22 hours and then tested to measure flexural strength and age resistance.

(B) For the purpose of comparison, the example was repeated, omitting the epoxidized polybutadiene. Sixty parts of the unsaturated polyester were blended with 40 parts of styrene and 1.0 part of benzoyl peroxide. The blend was poured into a sheet mold and precured 2 hours at 60° C., 2 hours at 90° C., and 30 minutes at 115° C. Samples of the precured casting were tested to measure flexural strength. Additional precured samples were postcured 24 hours at 155° C. and tested to measure flexural strength and age resistance.

The data obtained from these tests are as follows:

| Sample | Epoxidized polybutadiene, percent | Flexural strength, p.s.i. Precured | Flexural strength, p.s.i. Postcured | Age resistance, percent weight loss |
|---|---|---|---|---|
| A | 20 | 17,100 | 15,300 | 2.7 |
| B | 0 | 14,500 | 13,000 | *20.0 |

*Cracked.

Laminates were prepared from blends of the unsaturated polyester and epoxidized polybutadiene as follows:

(C) A resin composition was prepared by blending together 48 parts of the unsaturated polyester, 32 parts of styrene, 20 parts of the epoxidized polybutadiene prepared in Example 1, 1.0 part of benzoyl peroxide, and 1.0 part of dicumyl peroxide. Using standard wet lay-up techniques, a 13-ply laminate was prepared by working the resin composition into successive layers of No. 181 fiber glass cloth having a methacrylatochrome complex finish, commonly known as Volan-A. The lay-up was molded for 1 hour at 116° C. in a hydraulic press using a ⅛ inch shim and postcured in an oven for 2 hours at 155° C. The resulting laminate had a resin content of 30%. Samples of the laminate were tested to measure flexural strength. The tensile strength of the laminate was determined by testing samples in accordance with ASTM designation D638–60T.

(D) For comparison, the laminate was repeated, omitting the epoxidized polybutadiene. Sixty parts of the unsaturated polyester were blended with 40 parts of styrene and 1.0 part of benzoyl peroxide. A 13-ply laminate was prepared as before using No. 181 fiber glass cloth having a Volan-A finish, molded for 1 hour at 116° C. in a hydraulic press using a ⅛ inch shim, and postcured 2 hours at 155° C. The resulting laminate had a resin content of 34%. Samples of the laminate were tested to measure flexural strength and tensile strength.

The following data were obtained from these laminates:

| Sample | Epoxidized polybutadiene, percent | Flexural strength, p.s.i. | Tensile strength, p.s.i. |
|---|---|---|---|
| C | 20 | 72,400 | 57,100 |
| D | 0 | 62,600 | 45,900 |

(E) A resin composition was prepared by blending together 48 parts of the unsaturated polyester, 32 parts of styrene, 20 parts of the epoxidized polybutadiene prepared in Example 1, 15 parts of hexahydrophthalic anhydride, 1.2 parts of glycerol, 1.5 parts of 2,5-bis(tert.-butyl peroxide)-2,5-dimethylhexane, and 1.0 part of benzoyl peroxide. A 13-ply laminate was prepared as before using a No. 181–136 fiber glass cloth having a vinyl trichlorosilane finish. The lay-up was molded for 1 hour at 116° C. using a ⅛ inch shim in a hydraulic press and postcured in an oven at 155° C. for 2 hours.

The resulting laminate had a resin content of 28%. Samples of the laminate were tested to measure flexural strength.

(F) For comparison, the laminate was repeated, omitting the epoxidized polybutadiene. Forth-eight parts of the unsaturated polyester were blended with 32 parts of styrene, and 1.0 part of benzoyl peroxide. A 13-ply laminate was prepared as before using a No. 181–136 fiber glass cloth having a vinyl trichlorosilane finish. The lay-up was molded for 1 hour at 116° C. using a ⅛ inch shim in a hydraulic press and postcured for 2 hours in an oven at 155° C. The resulting laminate had a resin content of 33%. Specimens were tested to measure flexural strength.

The following data were obtained for these laminates:

| Sample | Epoxidized polybutadiene, percent | Flexural strength, p.s.i. |
| --- | --- | --- |
| E | 20 | 90,300 |
| F | 0 | 63,400 |

*Example 9*

Butadiene was polymerized as follows: About 4.3 parts of sodium as a 46% dispersion in kerosene and 162 parts of benzene were charged to an agitated reactor, the temperature was raised to 95° C., and 3.0 parts of technical grade butadiene were added. The temperature was maintained at about 85° C. while 97 parts of butadiene and 10 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383, viscosity of 10 poises at 25° C. extrapolated to zero shear, and number average molecular weight of 980.

The polybutadiene was epoxidized as follows: About 100 parts of liquid polybutadiene, 100 parts of benzene, 21 parts of Dowex resin 50 X–12 (a sulfonated styrene-divinylbenzene polymer cross-linked with 12% divinylbenzene) and 11 parts of glacial acetic acid were heated with agitation to 60° C. About 47 parts of 50% hydrogen peroxide were then added over a period of 2 hours. The temperature was maintained at 60° C. for an additional 2.0 hours, the mixture was cooled to 30° C., mixed with 92 parts of benzene and 17 parts of soda ash, and allowed to settle. The oily layer was separated and filtered. The filtrate was heated to 80° C. to remove the water azeotropically, and then stripped of benzene at 80° C. and 60 mm. Hg. The epoxypolybutadiene obtained as residue had an epoxy oxygen content of 6.2% and a viscosity of 695 poises at 25° C. extrapolated to zero shear.

(A) A resin composition was prepared by blending together 63 parts of the unsaturated polyester prepared in Example 3, 27 parts of styrene, 10 parts of the epoxidized polybutadiene, 0.7 part of benzoyl peroxide, and 0.7 part of 2,5-bis (tert.-butyl peroxide)-2,5-dimethylhexane. The blend was poured into a sheet mold and cured 2 hours at 60° C., 2 hours at 90° C., 5 minutes at 115° C., and 24 hours at 155° C. Samples of the casting were tested to measure acetone resistance and age resistance.

(B) For comparison, the example was repeated, omitting the epoxidized polybutadiene. Seventy parts of the unsaturated polyester were blended with 30 parts of styrene and 1.0 part of benzoyl peroxide. The blend was poured into a sheet mold and cured 2 hours at 60° C., 2 hours at 90° C., 0.5 hour at 115° C., and 24 hours at 155° C. Samples of the casting were tested to measure acetone resistance and age resistance.

The following data was obtained for the above resin compositions:

| Sample | Epoxidized polybutadiene, percent | Acetone resistance | Age resistance, percent weight loss |
| --- | --- | --- | --- |
| A | 10 | Flaked | 8.5 |
| B | 0 | Crumbled | 12.2 |

Although the process and products of this invention have been described and exemplified in such manner that one skilled in the art can readily understand and practice the invention, numerous modifications and variations of the formulations described above may be made without departing from the spirit of the invention or the scope of the following claims.

We claim:
1. A curable resin composition comprising 50–95% by weight of the total resin of, in combination (a) an unsaturated polyester derived from an unsaturated dicarboxylic acid and a dihydric alcohol, and having an acid number in the range of 5–50, and (b) a reactive monomer containing a polymerizable double bond, said monomer being 10–65% of the total weight of polyester and monomer; 5–50% by weight of the total resin of an epoxidized polybutadiene having an epoxy oxygen content of at least 5% by weight and containing reactive double bonds; and a catalytic amount of an organic peroxide having a decomposition temperature of at least 60° C.

2. A curable resin composition in accordance with claim 1 which contains a polyfunctional active hydrogen curing agent for the epoxidized polybutadiene.

3. A curable resin composition comprising 75–90% by weight of the total resin of, in combination (a) an unsaturated polyester derived from maleic anhydride, phthalic anhydride and an aliphatic glycol, and having an acid number of 10–40, and (b) a vinylbenzene, said vinylbenzene being 30–50% of the total weight of polyester and vinylbenzene; 10–25% by weight of the total resin of an epoxidized polybutadiene having an epoxy oxygen content of 8–10% by weight and containing reactive double bonds; and 0.5–3% by weight of the total resin of an organic peroxide having a decomposition temperature of 70–130° C.

4. A curable resin composition in accordance with claim 3 which contains a dicarboxylic anhydride-polyhydric alcohol curing agent for the epoxidized polybutadiene.

5. The method for preparing a polyester resin having improved properties which comprises curing a mixture containing 50–95% by weight of the total resin of, in combination, (a) an unsaturated polyester derived from an unsaturated dicarboxylic acid and a dihydric alcohol, and having an acid number in the range of 5–50, and (b) a reactive monomer containing a polymerizable double bond, said monomer being 10–65% of the total weight of polyester and monomer; 5–50% by weight of the total resin of an epoxidized polybutadiene having an epoxy oxygen content of at least 5% by weight and containing reactive double bonds; and a catalytic amount of an organic peroxide having a decomposition temperature of at least 60° C., by heating said mixture at a temperature of at least 70° C. for a period of at least 15 seconds.

6. The method of claim 5 in which said mixture contains a polyfunctional active hydrogen curing agent for the epoxidized polybutadiene.

7. The method for preparing a polyester resin having improved properties which comprises curing a mixture containing 75–90% by weight of the total resin of, in combination, (a) an unsaturated polyester derived from maleic anhydride, phthalic anhydride and an aliphatic glycol, and having an acid number in the range of 15–40, and (b) a vinylbenzene, said vinylbenzene being 30–50% of the total weight of polyester and vinylbenzene; 10–

25% by weight of the total resin of an epoxidized polybutadiene having an epoxy oxygen content of 8–10% by weight and containing reactive double bonds; and 0.5–3% by weight of the total resin of an organic peroxide having a decomposition temperature of 70–130° C., by heating said mixture at a temperature of 80–200° C. for period of 30 seconds to 5 hours.

8. The method of claim 7 in which said mixture contains a dicarboxylic anhydride-polyhydric alcohol curing agent for the epoxidized polybutadiene.

9. A cured resin composition comprising the reaction product of 50–95% by weight of the total resin of, in combination, (a) an unsaturated polyester derived from an unsaturated dicarboxylic acid and a dihydric alcohol, and having an acid number in the range of 5–50, and (b) a reactive monomer containing a polymerizable double bond, said monomer being 10–65% of the total weight of polyester and monomer; 5–50% by weight of the total resin of an epoxidized polybutadiene having an epoxy oxygen content of at least 5% by weight and containing reactive double bonds; and a catalytic amount of an organic peroxide having a decomposition temperature of at least 60° C.

10. A cured resin composition in accordance with claim 9 which contains a polyfunctional active hydrogen curing agent for the epoxidized polybutadiene.

11. A cured resin composition comprising the reaction product of 75–90% by weight of the total resin of, in combination, (a) an unsaturated polyester derived from maleic anhydride, phthalic anhydride and an aliphatic glycol, and having an acid number in the range of 15–40, and (b) a vinylbenzene, said vinylbenzene being 30–50% of the total weight of polyester and vinylbenzene; 10–25% by weight of the total resin of an epoxidized polybutadiene having an epoxy oxygen content of 8–10% by weight and containing reactive double bonds; and 0.5–3% by weight of the total resin of an organic peroxide having a decomposition temperature of 70–130° C.

12. A cured resin composition in accordance with claim 11 which contains a dicarboxylic anhydride-polyhydric alcohol curing agent for the epoxidized polybutadiene.

References Cited by the Examiner

UNITED STATES PATENTS

| | | | |
|---|---|---|---|
| 2,859,199 | 11/58 | Parker | 260—861 |
| 2,934,516 | 4/60 | Hicks | 260—829 |
| 2,955,101 | 10/60 | Bruin et al. | 260—30.4 |
| 2,965,602 | 12/60 | Hicks | 260—837 |
| 3,000,848 | 9/61 | McGary et al. | 260—835 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,217,066                                November 9, 1965

Frank P. Greenspan et al.

It is hereby certified that error appears in the above numbered patent requiring correction and that the said Letters Patent should read as corrected below.

Column 2, line 8, for "bicycle-" read -- bicyclo- --; column 3, line 18, for "handle" read -- handled --; column 6, line 30, for "0.4" read -- 0.24 --; line 64, for "tsrength" read -- strength --; column 9, line 27, for "casing" read -- casting --; line 37, after "distortion" strike out the comma; column 13, line 5, for "Forth-eight" read -- Forty-eight --; column 15, line 6, after "for" insert -- a --.

Signed and sealed this 20th day of September 1966.

(SEAL)
Attest:

ERNEST W. SWIDER                                EDWARD J. BRENNER
Attesting Officer                                    Commissioner of Patents